June 6, 1967 K. W. BINDING 3,323,834
SAFETY BELT TAKE-UP
Filed Feb. 13, 1964 2 Sheets-Sheet 1
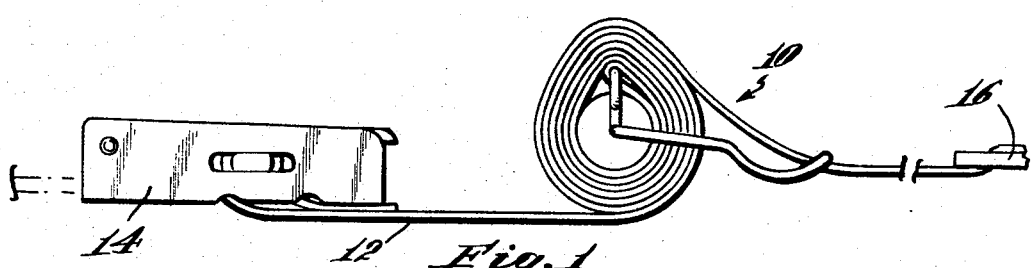
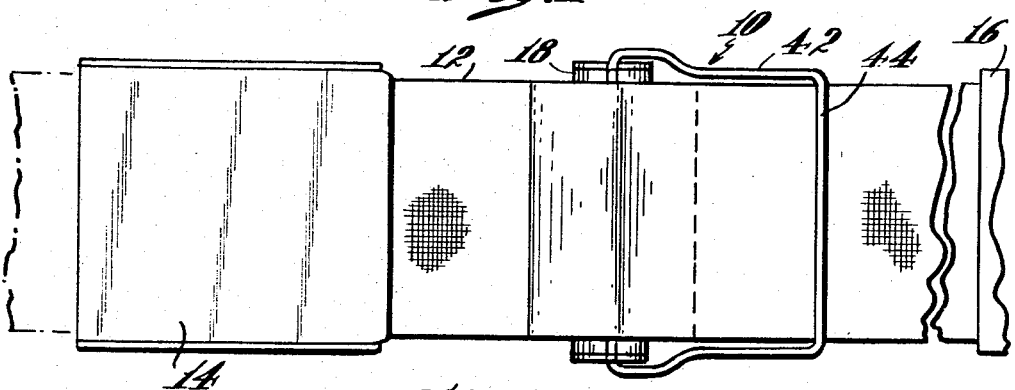
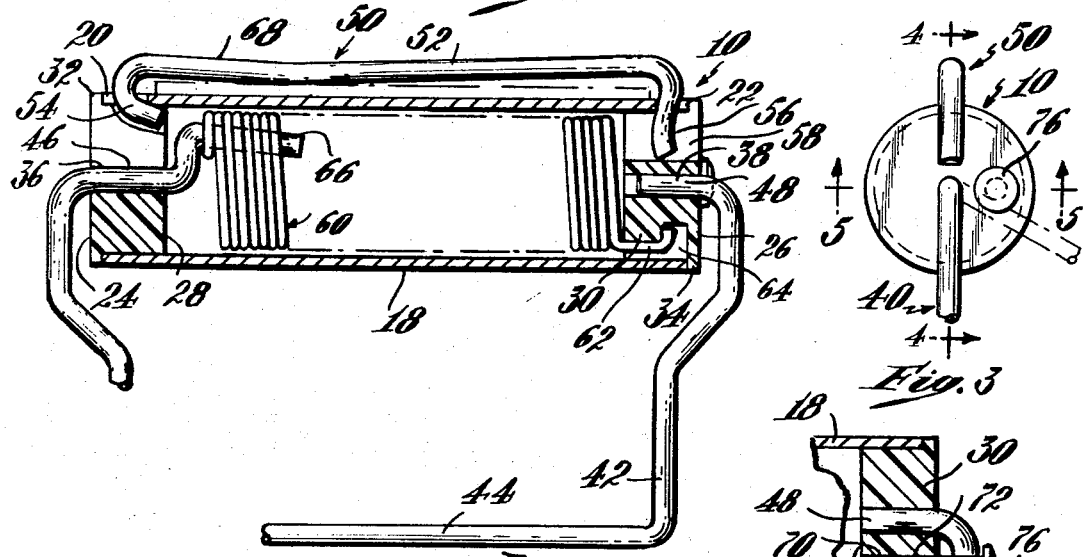
INVENTOR.
Kenneth W. Binding
BY Roberts, Cushman & Grover
ATT'YS

United States Patent Office 3,323,834
Patented June 6, 1967

3,323,834
SAFETY BELT TAKE-UP
Kenneth W. Binding, Winchester, Mass., assignor to Market Forge Company, Everett, Mass., a corporation of Massachusetts
Filed Feb. 13, 1964, Ser. No. 344,689
16 Claims. (Cl. 297—388)

This invention relates to a spring retractor for storing an elongate, flexible element, such as a belt, for extension when in use and retraction for storage, and, in particular, for safety belts, such as are employed in automobiles, planes and boats, to prevent the occupant from being thrown out in the event of loss of control or collision.

The principal objects of the invention are to provide a structure which is extremely compact and in the form of a spool about which the belt is coiled and uncoiled; to provide a structure which will accommodate belts of different thickness; to provide a structure with spring means which yields the belt during extension easily without binding and yet will return promptly; to provide a structure designed to prevent damage to the retracting spring by winding in the wrong direction; to provide a structure of such make-up as to be easily assembled; to provide a structure comprised of components which are readily available and can be readily made; to provide a structure which is durable and its presence in association with the belt does not weaken the latter or interrupt its continuity; and to provide a structure which is not subject to corrosion and hence will retain its initial appearance throughout use.

As herein illustrated, the structure comprises, in combination with a belt, a hollow cylinder, a first part mounted lengthwise of the cylinder for pivotal movement relative thereto about the longitudinal axis of the cylinder and in spaced parallel relation to the surface of the cylinder, said first part having engagement with one side of the belt, means on the cylinder, adjacent the surface lengthwise thereof, having contact with the opposite side of the belt and holding the latter engaged with the surface of the cylinder, and a coiled spring situated in the cylinder operative to effect relative rotation of the cylinder and hence the second part relative to the first part to take up the belt about the cylinder between it and the first part. The first part is in the form of a bail having spaced parallel limbs, a loop joining them held in spaced parallel relation to the external surface of the cylinder by inturned ends mounted in supports at the ends of the cylinder. One of the supports has diametrically disposed, radially extending slots and one end of the spring has a part extending therefrom into one of the radial slots in the support at that end anchoring the spring thereto. The other support has a radial slot extending from the peripheral surface to the center for receiving the inturned end of the bail at that end of the cylinder, the latter having an eccentric part engaged with an eye at the adjacent end of the spring. The wall of the cylinder has holes at its opposite ends in registration with the radial slots in the supports and the second part, which constitutes a keeper and which is in the form of a rod having a hook at one end and a latch at the other end, is disposed in parallel relation to the surface of the cylinder with the hook engaged with the radial slot at the one end and the latch frictionally engaged with the radial slot at the other end. The sleeve is comprised of anodized aluminium and the supports are comprised of nylon. To facilitate assembly one of the supports contains a hole through it in which is situated a pin which is adapted to be withdrawn so as to engage a limb of the bail to hold the latter fixed relative to the cylinder to enable pretensioning the spring during assembly. There is means for preventing complete withdrawal of the pin so as to avoid loss and to permit it to be stored in an inoperative position within the cylinder without interfering with the operation of the latter. There is also a winding guide secured to the end of the support on which the pin is mounted, one end of which is secured to the support and the other end of which is secured to the pin. The winding guide is operative, when unconstrained, to hold the pin distended so that the bail cannot be turned in the wrong direction. The winding guide is yieldable when the bail is turned in the right direction to depress the pin sufficiently to permit the pin to pass over it.

The invention will now be described in greater detail with reference to the accompanying drawings wherein:

FIG. 1 is a side elevation showing the belt and takeup with one end of the belt attached to a buckle and the other end attached to an anchor plate adapted to be secured to some part of the vehicle;

FIG. 2 is a plan view of FIG. 1;

FIG. 3 is an end elevation of the take-up with the belt removed;

FIG. 4 is a section taken on line 4—4 of FIG. 3, to much larger scale;

FIG. 5 is a section taken on line 5—5 of FIG. 3;

FIG. 6 is an end view of the support at the left end of FIG. 4;

FIG. 7 is an end view of the support at the right end FIG. 4;

FIG. 8 is an elevation of the left end of the spring;

FIG. 9 is an elevation of the right end of the spring;

Figure 10:
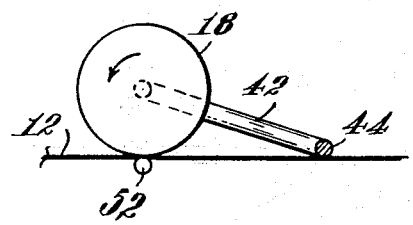
Figure 11:
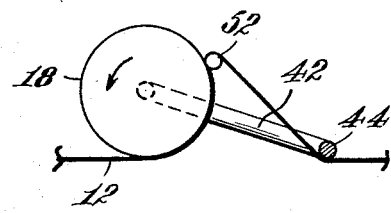
Figure 12:
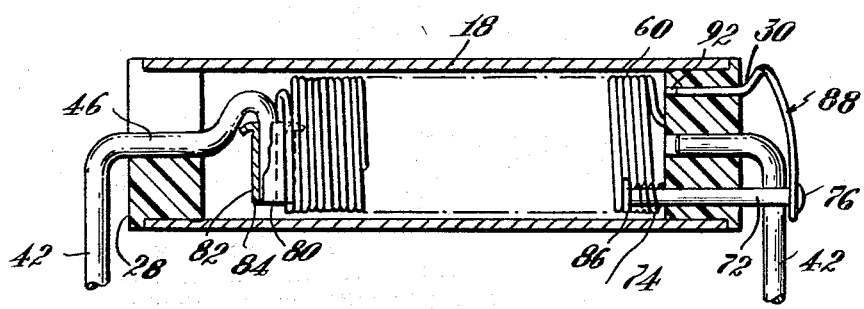
Figure 13:
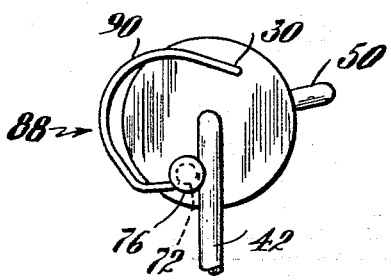
Figure 14:
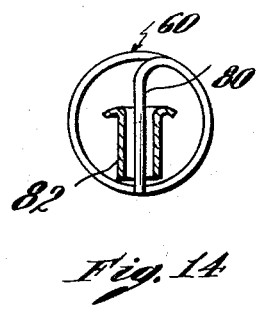

FIG. 10 diagrammatically illustrates the relation of the component parts of the device relative to the belt when the latter is pulled straight out;

FIG. 11 diagrammatically illustrates the relation of the component parts of the device relative to the belt, following the initial formation of the loop in the belt which has been pulled through the bail by the keeper;

FIG. 12 is a longitudinal diametrical section of a modified form of take-up provided with a winding guide;

FIG. 13 is a view of the take-up shown in FIG. 12 at the end having the winding guide thereon; and FIG. 14 is an end view of the left end of the spring showing the eyelet thereon.

Referring to the drawings (FIGS. 1 and 2), the device 10 is shown in its use for coiling a safety belt 12 when the latter is not in use, one end of the belt being secured to buckle 14 and the other end being secured to an anchor plate 16 adapted to be secured to some part of the vehicle with which it is used.

As illustrated, the device is of relatively small diameter, has an axial length which corresponds substantially in length to the width of the belt to be wound upon it, and forms a compact core or spool upon which the belt is wound into a compact coil.

The device comprises a hollow cylinder 18, at the opposite ends of which there are notches 20 and 22. A pair of supports 24 and 26 are secured in the open ends of the sleeves, each of which has a cylindrical portion 28, 30 adapted to be press-fitted into the open end of the cylinder and a flange 32, 34 adapted to have engagement with the end of the cylinder. The support 24 contains a centrally located hole 36 and the support 26 has a centrally located hole 38.

A belt guide 40, in the form of a bail having spaced parallel limbs 42—42 and a loop 44 joining the limbs, is rotatably supported in the supports by inturned end portions 46 and 48, rotatably engaged in the holes 36 and 38. The limbs 42—42 of the bail are curved concavely (FIG. 1) with respect to the plane of the bail opposite the side through which the belt passes.

A keeper 50 is provided for holding the belt engaged with the cylinder and this comprises a resilient rod 52 bent at a slight angle intermediate its ends and having at one end a hook 54 and at its opposite end a latch 56. The hook 54 is inserted through the hole 20 at one end of the cylinder into a radial slot 56 formed in the support 24 and is thus securely captivated while permitting pivotal movement of the keeper rod relative to the surface of the cylinder to enable inserting the belt between it and the cylinder. The latch 56 at the opposite end is bent at a re-entrant angle with respect to the keeper rod and is frictionally engaged through the hole 22, at that end of the cylinder, within a radial slot 58 in the support 26. Since the keeper rod 52 is yieldable and is slightly bent intermediate its ends, it can accommodate itself by its elasticity to receive belts of different thickness. Additionally, the knee at the bend imparts pressure which helps to bind the belt against the surface of the cylinder when the latch 56 is engaged.

A coiled spring 60 is disposed in the cylinder between the supports and has at one end a hook 62 which is engaged within a radial slot 64 in the support 26. The inturned end 46 of the bail has an eccentrically offset part 66 which extends through an eye 68 at the opposite end of the spring. As thus constructed, rotation of the cylinder 18, relative to the bail, will impart tension to the spring and release of the cylinder will permit the spring to restore the cylinder to its original position. In practice, the spring is placed under an initial tension so that even when the belt is completely retracted tension remains in the spring.

The belt is assembled with the take-up in such fashion that the loop of the bail has contact with one side of the belt and the keeper has contact with the other side of the belt and holds the belt engaged with the surface of the cylinder. FIG. 10 shows the relation of the parts when the belt is pulled out straight and FIG. 11 shows the relation of the parts with a loop of the belt started through the bail.

As previously mentioned, the device is designed to facilitate assembly. This is accomplished by first press-fitting the support 24 into the left-hand end of the cylinder 18. The radial slot 56 in the support enables forcing the support into place without difficulty. The hooked end 54 of the keeper is now thrust through the hole 20 into the slot 56 in the support, leaving the latch free. The spring 60 is now placed in the cylinder from the right-hand end whereupon the support 24 is inserted into the right end of the cylinder against the end of the spring in such fashion as to engage the hook 42 with the radial slot 44 in the support. The inwardly extending ends of the bail are now inserted into the holes 36, 38 of the supports, the slot in the support 28 permitting the offset portion 66 to be thrust through it and into the eye 68 of the spring.

To provide for pretensioning the spring 60, the support 26 contains a hole 70 through it in which there is slidably mounted a pin 72 having, as shown in FIG. 5, a head 74 at its inner end and a head 77 at its outer end. The pin is of greater length than the support is thick and so may be withdrawn to the position shown in FIG. 5, wherein the head 76 extends outwardly beyond the limb 42 of the bail thus preventing relative movement of the support and the bail. It is thus possible, by rotating the cylinder relative to the support, to place a predetermined amount of stress in the spring by winding it relative to its longitudinal axis, then pull the pin 72 out to hold the spring in tension while the belt is assembled on the cylinder. By rotating the cylinder two turns, approximately 16 inches of belt will be taken up. Two and one-half turns will take up approximately 22 inches of the belt.

Assembly is accomplished by placing a portion of the belt, intermediate its ends, against the surface of the cylinder beneath the keeper and then engaging the latch 56 of the keeper with the hole 22 and slot 58. The portions of the belt at opposite sides of the keeper extend away from it respectively to the buckle and to the anchor plate, as shown in FIG. 10. The pin 72 is now pushed back into the cylinder to release the bail whereupon the spring operates to rotate the cylinder and hence the keeper relative to the bail, as indicated by the arrow in FIG. 11, to form a loop in the belt and to pull the loop through the bail so as to wind a loop of increasing length about the cylinder between its surface and the bail, as shown in FIG. 1.

If desired, a friction element 78 may be incorporated in the support 26, frictionally to oppose movement of the pin 72, so that there is no danger of its becoming accidentally displaced in one direction or the other.

An alternative form of take-up is shown in FIGS. 12 and 13 which differs from that disclosed in the preceding figures in two respects, to wit, the connection of the spring at the left end to the bail and the provision of a winding guide at the right end. Referring to FIGS. 12 and 14, the spring 60 has at its left end, as shown, a diametrically disposed tail 80 which lies substantially in the plane of the last coil and an eyelet 82 in the form of a hollow rivet or the like is loosely mounted on the tail, being retained thereon by engagement of the end of the tail with the perimeter of the coil. The inturned end 46 of the limb 42 has a hook 84 for engagement with the eyelet so that rotation of the cylinder relative to the bail winds the spring in compression.

The pin 72 at the opposite end is provided at its inner end with a head 74 and a coiled spring 86 is placed between it and the inside of the support 30 to hold it completely retracted when not being used for the purpose of assembly. In order to prevent winding the bail in the wrong direction, prior to assembly with the belt, and hence damaging the spring, and also to hold the spring under tension when being mounted on the belt, there is a winding guide 88 on the support 30 which, by engagement with the pin, yieldably holds it distended. The guide comprises a resilient curved wire 90 (FIGS. 12 and 13), one end of which is anchored to the support 30 in a hole 92 inwardly of the axis of the limb 42 and the other end of which is secured to the head of the pin 72 outwardly of the axis of the limb, the portion of the guide between these points inclining outwardly from one to the other. The pin 72 provides a stop which, by engagement with the limb, prevents the bail from unwinding and the guide is operative, by rotation of the bail away from the pin, to depress the pin sufficiently to permit the limb to pass over it and hence to impart greater tension to the spring. After the take-up has been installed on the belt, the winding guide is removed to permit the pin to be retracted to an out-of-the-way position. However, if at any time it becomes necessary to rewind or reinstall the device, the winding guide may be replaced.

As previously stated, the cylinder is made of aluminum and anodized on its surface so as to preserve its finish. The supports are comprised of nylon, the spring bail and clamp of stainless steel so that no corrosion will take place.

The outside diameter of the cylinder is ⅝ of an inch and the overall length 2¼ inches, thus providing a very compact assembly for winding the belt which has the advantage that it does not have to be fastened to any part of the vehicle and the further advantage that it does not have to be made to withstand the stress in the belt.

It should be understood that the present disclosure is for the purpose of illustration only and that this invention includes all modifications and equivalents which fall within the scope of the appended claims.

I claim:
1. In combination with a belt, a hollow cylinder, a bail having inturned ends supported at the ends of the cylinder for rotation about an axis located at the center of said ends and a part spaced from and parallel to the surface of the cylinder, keeper means secured adjacent the surface of the cylinder lengthwise thereof, said keeper means having contact with one side of the belt and holding it engaged with the surface of the cylinder, said part of the bail spaced from the surface of the cylinder having contact with the opposite side of the belt, and a pre-stressed coiled spring situated in the cylinder with one end connected to the cylinder and the other end connected to one of the inturned ends of the bail, said spring being operative to effect rotation of the cylinder and bail relative to each other to take up the belt about the cylinder between it and the bail.

2. In combination with a belt, a hollow cylinder, a support situated at each end of the cylinder, each support containing a centrally located hole, a bail having spaced parallel limbs, a part joining the limbs which is spaced from and parallel to the surface of the cylinder, and inturned ends substantially parallel to said part, said ends being rotatably disposed in the holes in the support, keeper means secured adjacent the surface of the cylinder lengthwise thereof, said keeper means having contact with one side of the belt and holding it in engagement with the surface of the cylinder, and said part of the bail spaced from the surface of the cylinder having contact with the opposite side of the belt, a coiled spring disposed in the cylinder between the supports partially twisted relative to its longitudinal axis, an eccentrically mounted hook at one end of the spring, said support at that end containing a recess within which the hook is lodged, an eye at the other end of the spring, and a part at the inturned end of the bail at that end engaged with said eye.

3. In combination with a belt, a hollow cylinder, supports non-rotatably secured in the ends of the cylinder, each support containing a centrally located hole, a bail having spaced parallel limbs, a loop joining the limbs, and inturned ends substantially parallel to the loop disposed in the holes in the supports, a keeper element secured adjacent the surface of the cylinder lengthwise thereof, said keeper element having contact with one side of the belt and holding the belt engaged with the surface of the cylinder, and said loop of the bail having contact with the opposite side of the belt, a coiled spring disposed in the cylinder between said supports with one end attached to one of the supports, said spring being prestressed, and an eccentric part on the inturned end of the limb at the opposite end pivotally connected to the spring at that end.

4. The combination according to claim 3, wherein the portion of the keeper intermediate the ends is bent at an angle toward the surface of the cylinder.

5. The combination according to claim 3, wherein the keeper is a resilient rod having a hook at one end and a latch at the other end engaged, respectively, with the ends of the cylinder.

6. The combination according to claim 3, wherein the limbs of the bail deviate relative to the plane of the bail at the side toward which the cylinder rotates.

7. The combination according to claim 3, wherein the supports are comprised of nylon press-fitted into the open ends of the cylinder.

8. In combination with a belt, a hollow cylinder, cylindrical supports at the end of the cylinder, said supports being non-rotatably secured in said ends, and each containing a centrally located hole, one of said supports containing a radial slot extending from the peripheral surface to the center, the other containing diametrically disposed radial slots, a bail having spaced parallel limbs, a loop joining the limbs, and inwardly extending ends rotatably disposed in the holes in the supports, a keeper rod having a hook at one end and a latch at the other, said hook being captivated in the radial slot in the support at that end and said latch being frictionally engaged with one of the diametrically located slots in the support at the other end, said bail having engagement with one side of the belt, and said keeper having engagement with the opposite side of the belt and holding the belt engaged with the surface of the cylinder, a coiled spring situated in the cylinder between the supports, means at one end of the spring engaged with the other of the diametrical slots in the support at that end anchoring the spring thereto, an eye at the other end of the spring, and an eccentric part on the inturned end of the bail at that end of the cylinder engaged with said eye.

9. In combination with a belt, a hollow cylinder, supports non-rotatably secured in the ends of the cylinder, each support containing a centrally located hole, a bail having spaced parallel limbs, a loop joining the limbs, and inturned ends substantially parallel to the loops rotatably disposed in the holes in the support, a keeper element secured adjacent the surface of the cylinder lengthwise thereof, said keeper element having contact with one side of the belt and holding the belt engaged with the surface of the cylinder, and said loop of the bail having contact with the opposite side of the belt, a coiled spring disposed in the cylinder between said supports with one end attached to one of the supports, said spring being prestressed, an eccentric part on the inturned end of the loop at the opposite end pivotally connecting the spring to that end, and a pin slidably mounted in the support to which the end of the spring is attached, said pin being positionable to prevent relative rotation of the bail and cylinder by engagement with the limb of the bail at that end.

10. The combination according to claim 9, wherein the pin has a head at each end operative to prevent the pin from being removed from said support.

11. The combination according to claim 9, wherein there is a friction element disposed adjacent the pin for resisting endwise movement thereof.

12. The combination according to claim 9, comprising a winder guide mounted on the outer side of the support on which the pin is mounted operative, by engagement with the pin, to hold the latter distended.

13. The combination according to claim 9, comprising a winder guide mounted on the outer side of the support on which the pin is mounted, said winder guide comprising a spring wire fixed at one end to the support and at its opposite end to the pin and operative, when unconstrained, to hold the pin distended, said winder guide being yieldable, by rotation of the bail in a direction away from the pin, to depress the pin sufficiently to permit the limb of the bail at that end to pass over the end of the pin.

14. In combination with a belt, a hollow cylinder, a support situated at each end of the cylinder, each support containing a centrally located hole, a bail having spaced parallel limbs, a part joining the limbs which is spaced from and parallel to the surface of the cylinder, and inturned ends substantially parallel to said part, said ends being rotatably disposed in the holes in the supports, keeper means adjacent the surface of the cylinder lengthwise thereof, said keeper means having contact with one side of the belt and holding it in engagement with the surface of the cylinder, and said part of the bail spaced from the surface of the cylinder having contact with the opposite side of the belt, a coiled spring disposed in the cylinder between the supports, said spring being under compression in torsion, a hook at one end of the spring, said support at that end containing a recess within which the hook is lodged, a diametrically disposed tail at the other end of the spring, an eye supported on the tail, and a hook at the inturned end of the bail at that end engaged with said eye.

15. In combination with a belt, a hollow cylinder, supports at the end of the cylinder containing centrally located holes, a bail having spaced parallel limbs, a loop connecting the limbs, and inturned ends pivotally mounted in the holes in the supports, a keeper secured lengthwise of the cylinder adjacent its surface, said keeper having contact with one side of the belt and holding the latter engaged with the surface of the cylinder, and said loop having contact with the opposite side of the belt, a coiled spring disposed under tension in the cylinder with one end anchored to the support at that end and the other end anchored to the inturned end of the bail at the opposite end, a pin at one end of the cylinder extending from the support at that end, means yieldably holding the pin distended beyond the limb of the bail at that end, said pin, when distended, preventing rotation of the bail in a direction to uncoil the spring, said yieldable means sloping from a point inside the axis of the limb to a point outside of the axis thereof and being operative, by rotation of the limb as the latter travels from the low end to the high end, to depress the pin.

16. The combination comprising a roller, a belt keeper element disposed in axially spaced parallel relation to the surface of the roller with its ends detachably secured thereto to enable securing a belt intermediate its ends to the roller with the portions at opposite sides wound in the same direction about the roller, a guide rotatably supported by the roller, said guide having a part parallel to the surface of the roller and at a sufficient radial distance therefrom to accommodate the completely wound belt when the latter is wound on the roller, said part having contact with the portion of the belt wound on the roller which lies on the outer side, and a spring prestressed in tension with one end fixed to the roller and the other end fixed to the guide, said spring urging rotation of the guide and roller relative to each other in a direction to wind the belt portion onto the roller.

References Cited
UNITED STATES PATENTS

| | | | |
|---|---|---|---|
| 1,313,644 | 8/1919 | Simon | 242—107.11 |
| 1,657,190 | 1/1928 | Ballou | 24—68 |
| 2,541,476 | 2/1951 | Mihalyi | 297—388 |
| 2,814,504 | 11/1957 | Campbell | 297—388 |

FRANK B. SHERRY, *Primary Examiner.*

J. S. PETRIE, *Assistant Examiner.*